United States Patent Office 2,916,485
Patented Dec. 8, 1959

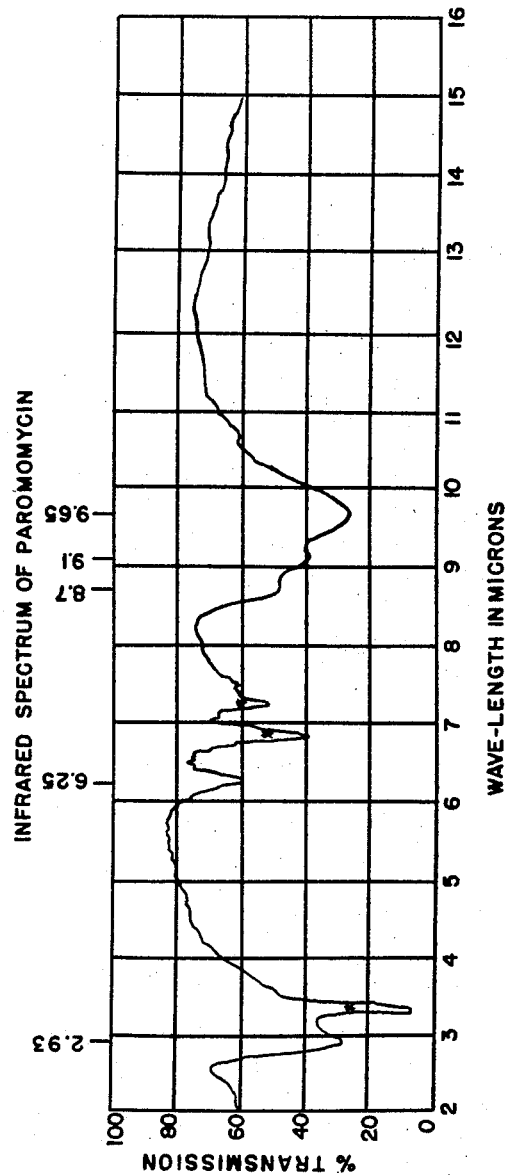

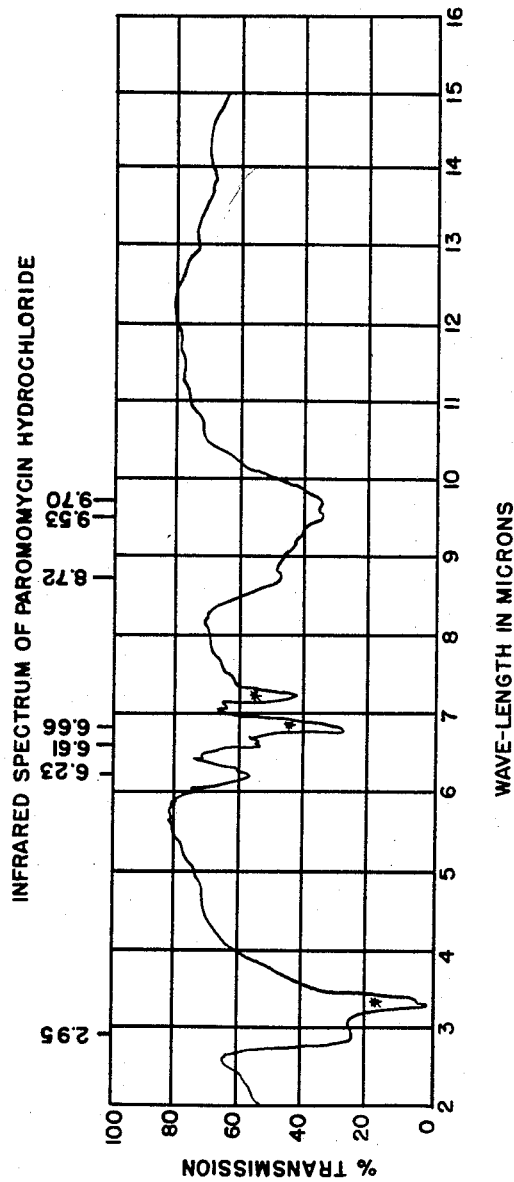

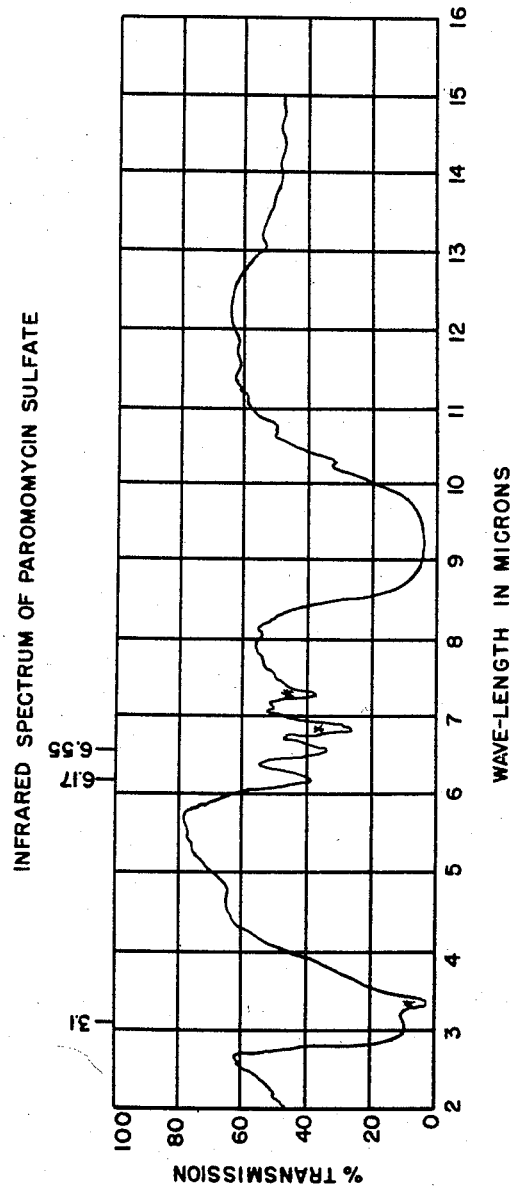
FIG.3. Infrared spectrum of paromomycin sulfate

2,916,485
ANTIBIOTIC AND METHODS FOR OBTAINING SAME

Roger P. Frohardt, Royal Oak, Theodore H. Haskell, Clawson, John Ehrlich, Grosse Pointe Park, and Mildred Penner Knudsen, Birmingham, Mich., assignors to Parke, Davis & Company, Detroit, Mich., a corporation of Michigan Application January 12, 1959, Serial No. 786,357

11 Claims. (Cl. 260—211)

This invention relates to a new chemical compound having valuable antibiotic properties. More particularly, the invention relates to a new and useful antibiotic called paromomycin, and to methods for its production. The invention includes the antibiotic and its salts, both in pure form and as crude concentrates.

Paromomycin is a chemical compound which has the formula,

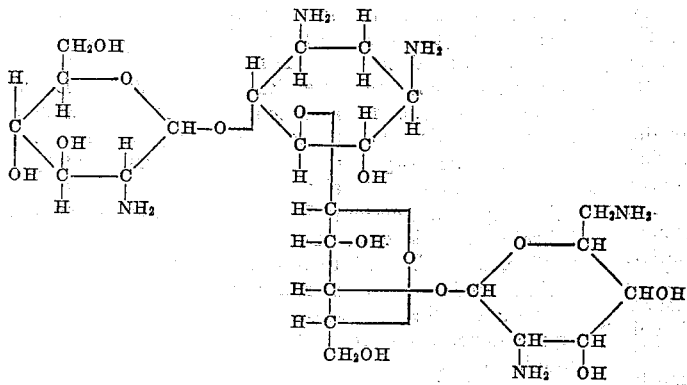

It is optically active and has an optical rotation $[\alpha]_D^{25}$ of $+64° \pm 3°$ (c.=1% in $H_2O$)

It is a stable amorphous white substance which is very soluble in water, moderately soluble in methanol and sparingly soluble in absolute ethanol.

Paromomycin gives a positive ninhydrin test, a positive Elson-Morgan test for an amino sugar, a negative test for maltol after heating with alkali, and a negative Sakaguchi test for guanidines.

The infrared absorption spectrum of paromomycin employing a mineral oil mull composed of pulverized material and mineral oil is characterized by absorption peaks at wave lengths 2.93 and 6.25 microns. Figure 1 shows the infrared absorption spectrum of paromomycin.

Paromomycin forms acid-addition salts with mineral acids such as hydrochloric acid, sulfuric acid and the like.

Paromomycin forms a hydrochloride having an optical rotation $[\alpha]_D^{25}$ of $+56.5° \pm 4°$ (c.=1% in $H_2O$). This substance exhibits pKa values of 6.3 and 8.35. The hydrochloride is more soluble in cold ethanol than in hot ethanol. The infrared absorption spectrum of paromomycin hydrochloride employing a mineral oil mull is characterized by absorption peaks at wave lengths 6.23, 6.61, 6.66, 8.72, 9.53 and 9.70 microns and an inflection at 2.95 microns. Figure 2 shows the infrared absorption spectrum of paromomycin hydrochloride.

Paromomycin forms a sulfate having an optical rotation $[\alpha]_D^{25}$ of $+50.5° \pm 4°$ (c.=1.5% in $H_2O$, pH 6). The infrared absorption spectrum of paromomycin sulfate employing a mineral oil mull is characterized by pronounced absorption peaks at wave lengths 6.17 and 6.55 microns and an inflection at 3.1 microns. Figure 3 shows the infrared absorption spectrum of paromomycin sulfate.

Paromomycin is degradable with mineral acid, such as hydrochloric acid, in aqueous solution to paromamine and paromobiosamine and in methanol to paromamine and the anomeric methyl glycosides of paromobiosamine. The aforementioned degradation products which are obtained in the form of their mineral acid salts have no appreciable antibacterial activity.

A solution of 2.81 g. of paromomycin hydrochloride in 280 ml. of anhydrous methanol is refluxed for two and one-half hours with 60 ml. of 1.8 N methanolic hydrogen chloride, during which time a crystalline precipitate is deposited. After refrigerating overnight, the precipitate consisting of the trihydrochloride of paromamine is collected by filtration and purified by recrystallization from aqueous ethanol. Elemental analysis shows the crystalline product to contain about 32–33% carbon, 7% hydrogen, 9–10% nitrogen and 23–24% chlorine. The product is optically active $[\alpha]_D^{26} = +81.8°$ (c.=1% in $H_2O$). The free base of paromamine which has the formula

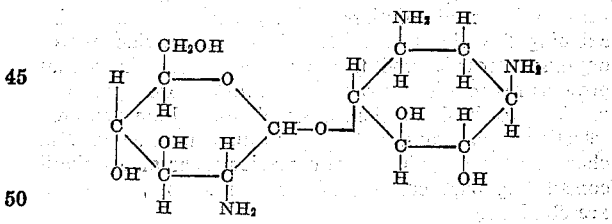

contains by elemental analysis about 44–45% carbon, 8% hydrogen and 13% nitrogen; $[\alpha]_D^{26} = +114°$ (c.=1.35% in $H_2O$). Both paromamine and paromamine trihydrochloride are inactive against B. subtilis, that is, neither causes measurable inhibition of the growth of B. subtilis at a concentration of 75 μg./ml.

The filtrate of the solution from which the paromamine trihydrochloride has been removed is evaporated to dryness in vacuo to obtain the anomeric methyl glycosides of paromobiosamine dihydrochloride. The product can be purified by dissolving it in water, passing the solution through a column of activated carbon, evaporation of the effluent to dryness in vacuo, dissolving the residue in methanol and precipitating the purified dihydrochloride with acetone or ether. The anomeric methyl glycosides of paromobiosamine dihydrochloride so obtained do not cause measurable inhibition of the growth of B. subtilis at a concentration of 1000 μg./ml. Hydrolysis of the anomeric methyl glycosides of paromobiosamine dihydrochloride by treatment with 0.5 N hydrochloric acid for seven hours at 100° C. followed by neutralization of the solution to about pH 5 with an anion exchange resin (Amberlite IR-45) in the hydroxyl form, passage of the solution over activated carbon, evaporation of the effluent to dryness in vacuo and trituration with ethanol yields paromobiosamine dihydrochloride as an amorphous solid; mutarotation value, $[\alpha]_D^{27}=+33.2°$ (c.=7% in $H_2O$) after five minutes, final value after 24 hours $[\alpha]_D^{27}=+37°$. The free base of paromobiosamine, which has the formula

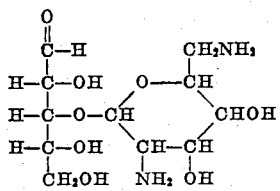

can be obtained as an amorphous solid by passing an aqueous solution of the dihydrochloride salt over an anion-exchange resin (Amberlite IRA-410) in the hydroxyl form and freeze-drying the effluent. Paromobiosamine has a mutarotation value of $+32°$ (c.=1% in $H_2O$). Neither paromobiosamine nor its hydrochloride causes measurable inhibition of the growth of B. subtilis at a concentration of 950 µg./ml.

Heating paromomycin with an excess of 0.5 N aqueous hydrochloric acid for seven hours at 100° C. yields paromamine trihydrochloride and paromobiosamine dihydrochloride. These hydrochloride salts, like the free bases obtainable from them, are identical with the corresponding substances prepared as described above.

Paromomycin can be prepared in accordance with the invention by microbiological synthetic means involving cultivating a microorganism called Streptomyces rimosus forma paromomycinus under artificial conditions in a suitable nutrient medium. The production of paromomycin by microbiological means is described hereinafter.

Streptomyces rimosus forma paromomycinus is a hitherto unknown microorganism which occurs in soils. It was isolated for the first time from a soil sample collected at Hacienda Tierradura, Miranda, Colombia, South America. Cultures of this microorganism can be obtained by preparing a suspension in sterile water of a soil sample containing it, allowing the heavier particles to settle, plating out the resulting supernatant soil suspension in serial dilutions on nutrient agar plates, incubating the plates at 24 to 28° C. to provide microorganism growths and transplanting selected individual growths resembling Streptomyces rimosus forma paromomycinus to fresh nutrient agar plates. Upon repeated selection and transplantation of uncontaminated and characteristic growths to fresh nutrient agar plates, thalli constituting pure cultures of the desired microorganism are obtained.

Streptomyces rimosus forma paromomycinus has the following characteristics: when grown on glycerol asparagine agar medium, the substratal mycelium is light yellow to brown and the aerial mycelium is white; on starch synthetic agar medium, the substratal mycelium is light brown and the aerial mycelium is white; on calcium malate agar medium, the substratal mycelium is light yellow-brown and the aerial mycelium is white; on nutrient agar medium, the substratal mycelium is light yellow-orange-brown and little or no aerial mycelium occurs; on glucose tryptone agar medium, the substratal mycelium is light yellow to light brown, the aerial mycelium is white, and a slight brown coloration appears in the agar medium. The surface colonies are raised, smooth, wrinkled or folded, and cracked in areas of dense growth; often the agar is also cracked. Microscopically, the aerial hyphae are irregularly branched; lateral branches are short and coiled. The spirals are numerous on most media and often occur in dense clusters. Distal portions of the aerial hyphae subdivide into sport chains.

Streptomyces rimosus forma paromomycinus liquifies gelatin with the formation of little or no color in the medium, and usually does not peptonize litmus milk. In synthetic agar medium [Pridham and Gottlieb, J. Bact., 56, 108 (1948)], the organism utilizes numerous carbon sources including adonitol, cellobiose, dextrin, dextrose, D-galactose, glycerol, i-inositol, lactose, levulose, maltose, D-mannitol, D-mannose, melibiose, sorbitol starch, and trehalose; less readily utilizes L-arabinose, raffinose, and xylose; and does not utilize aesculin, dulcitol, inulin, melezitose, rhamnose, salicin, and sucrose. The organism utilizes numerous nitrogen sources including DL-alanine, L-arginine, DL-aspartic acid, L-cystine, L-cysteine, L-glutamic acid, glycyl-glycine, L-histidine, L-leucine, L-lysine, L-phenylalanine, L-proline, DL-serine, DL-threonine, DL-valine, ammonium sulfate, and sodium nitrate; and less readily utilizes L-hydroxyproline, DL-isoleucine, DL-methionine, L-tryptophane, L-tyrosine, DL-norleucine, urea, and ammonium carbonate.

Morphologically, Streptomyces rimosus forma paromomycinus closely resembles Streptomyces rimosus (described by Sobin et al. in United States Patent No. 2,516,080 and maintained as NRRL-2234 in the permanent culture collection of the Fermentation Laboratory, Northern Utilization Research and Development Division, U.S. Department of Agriculture, at Peoria, Illinois). These two microorganisms possess similar substratal and aerial mycelia coloration as indicated in Table I. S. rimosus is somewhat darker and often colors the agar more than does Streptomyces rimosus forma paromomycinus. In carbon-utilization tests, Streptomyces rimosus

TABLE I

Comparison of coloration of Streptomyces rimosus forma paromomycinus and Streptomyces rimosus NRRL 2234 cultivated on various agar media

| Agar Medium | Feature | Streptomyces rimosus forma paromomycinus | S. rimosus NRRL 2234 |
|---|---|---|---|
| Glycerol asparagine | Substratal mycelium | Light yellow to light brown | Yellow to light brown. |
| | Aerial mycelium | White | White. |
| | Substrate | None | Slight light brown. |
| Starch synthetic | Substratal mycelium | Light brown | Light brown. |
| | Aerial mycelium | White (slight aerial) | White. |
| | Substrate | None | None. |
| Calcium malate | Substratal mycelium | Yellow-brown | Yellow-brown. |
| | Aerial mycelium | White | White. |
| | Substrate | None | Slight light brown. |
| Nutrient | Substratal mycelium | Light yellow-orange brown | Light yellow-brown. |
| | Aerial mycelium | (no aerial) | White (slight aerial). |
| | Substrate | None | None. |
| Glucose tryptone | Substratal mycelium | Light yellow to light brown | Yellow-brown to orange-brown. |
| | Aerial mycelium | White | White. |
| | Substrate | Slight light brown | Light brown. | forma *paromomycinus* and *S. rimosus* utilize the same carbon sources except L-arabinose which *Streptomyces rimosus* forma *paromomycinus* utilizes poorly or not at all and *S. rimosus* utilizes well (Table II). With respect to nitrogen utilization, the two organisms are similar (Table III).

TABLE II

*Comparison of carbon utilization of* Streptomyces rimosus *forma* paromomycinus *and* S. rimosus *NRRL 2234*

| Carbon Sources [1] | Streptomyces rimosus forma paromomycinus | S. rimosus NRRL 2234 |
|---|---|---|
| Monosaccharides: | | |
| Pentoses— | | |
| L-arabinose | 0 to + | ++++ |
| Rhamnose | 0 | 0 |
| D-xylose | 0 to + | 0 to + |
| Hexoses— | | |
| Dextrose | ++++ | ++++ |
| D-galactose | ++++ | ++++ |
| Levulose | ++++ | ++++ |
| D-mannose | ++++ | ++++ |
| Disaccharides: | | |
| Cellobiose | ++++ | ++++ |
| Lactose | ++ to ++++ | ++++ |
| Maltose | ++++ | ++++ |
| Melibiose | +++ | ++ to ++++ |
| Sucrose | 0 | 0 |
| Trehalose | +++ | ++++ |
| Trisaccharides: | | |
| Melezitose | 0 | 0 |
| Raffinose | + to ++ | + to ++ |
| Polysaccharides: | | |
| Dextrin | ++++ | ++++ |
| Inulin | 0 | 0 |
| Starch | ++++ | ++++ |
| Polyhydric alcohols: | | |
| Adonitol | ++++ | +++ |
| Dulcitol | 0 | 0 |
| Glycerol | +++ | +++ |
| i-Inositol | ++++ | ++++ |
| D-mannitol | ++++ | ++++ |
| D-sorbitol | ++++ | ++++ |
| Miscellaneous: | | |
| Aesculin | 0 | 0 |
| Salicin | 0 | 0 |

0 = no growth.
+ = poor growth.
++ = fair growth.
+++ = good growth.
++++ = very good growth.

[1] Each carbon source was tested at a concentration of 1.0 percent by weight in the synthetic agar medium described by Pridham and Gottlieb, J. Bact., 56, 108, 1948.

TABLE III

*Comparison of nitrogen utilization of* Streptomyces rimosus *forma* paromomycinus *and* S. rimosus *NRRL 2234*

| Nitrogen Sources [1] | Streptomyces rimosus forma paromomycinus | S. rimosus NRRL 2234 |
|---|---|---|
| Inorganic: | | |
| Sodium nitrate | ++++ | ++++ |
| Ammonium sulfate | ++++ | ++++ |
| Ammonium carbonate | ++ | ++ |
| Organic: | | |
| DL-alanine | ++++ | ++++ |
| L-arginine | ++++ | ++++ |
| DL-aspartic acid | ++++ | ++++ |
| L-cystine | +++ | +++ |
| L-cysteine | +++ | +++ |
| L-glutamic acid | ++++ | ++++ |
| Glycyl-glycine | ++++ | ++++ |
| L-histidine | ++++ | +++ |
| L-hydroxyproline | + | + |
| DL-isoleucine | ++ | ++ |
| L-leucine | +++ | ++++ |
| L-lysine | ++++ | +++ |
| DL-methionine | + | ++ |
| L-phenylalanine | ++++ | ++++ |
| L-proline | +++ | +++ |
| DL-serine | ++++ | +++ |
| DL-threonine | ++++ | ++++ |
| L-tryptophane | + | + |
| L-tyrosine | + | + |
| DL-norleucine | ++ | +++ |
| DL-valine | ++++ | ++++ |
| Urea | ++ | ++ |

[1] Each nitrogen source was tested at a 0.01 M concentration of equivalent nitrogen in the synthetic agar medium described by Pridham and Gottlieb, J. Bact., 56, 108, 1948, modified by the omission of ammonium sulfate and the addition of 1.0 percent by weight of dextrose.

Microscopically, *Streptomyces rimosus* forma *paromomycinus* closely resembles *S. rimosus*. Both organisms form dense clusters of spirals on glycerol asparagine, starch synthetic, calicum malate, and glucose tryptone agar media. On nutrient agar medium both organisms form but little aerial mycelium and microscopically their aerial hyphae are mostly short and straight with only occasional spirals. With both organisms the surface growth and agar often crack in areas of dense growth on various agar media.

Since *Streptomyces rimosus* forma *paromomycinus* closely resembles *S. rimosus* NRRL 2234 morphologically and in many respects physiologically, it is concluded that *Streptomyces rimosus* forma *paromomycinus* represents a new and distinct form of *Streptomyces rimosus*. A culture of *Streptomyces rimosus* forma *paromomycinus* is being maintained in the permanent culture collection of Parke, Davis & Company Culture Bureau, Detroit, Michigan, under No. 04998 and in the Culture Collection of the Fermentation Laboratory, Northern Utilization Research and Development Division, U.S. Department of Agriculture, Peoria, Illinois, under No. NRRL 2455.

The production of paromomycin in accordance with the invention is carried out by inoculating a sterile aqueous nutrient medium with *Streptomyces rimosus* forma *paromomycinus*, incubating the inoculated medium under aseptic aerobic conditions at a temperature between about 20 and 35° C., removing the solid material present in the culture mixture, and isolating the desired paromomycin from the aqueous culture liquid.

For the inoculation, spores or conidia of *Streptomyces rimosus* forma *paromomycinus* can be used. Aqueous suspensions of the same containing a minor proportion of soap or other wetting agent can also be used. For large fermentations it is preferable to use vigorous, young cultures of the microorganism.

Suitable aqueous nutrient media are those having a pH between 6 and 8.5 and containing an assimilable carbon source and a source of nitrogen and minerals. As assimilable carbon sources, either the pure carbohydrates or the commercially available carbohydrate mixtures may be used. Some examples of the materials which are suitable for this purpose include glucose, d-mannose, d-galactose, corn syrup, starch, soluble starch, malt liquors, blackstrap molasses, hydrolyzed starches, glycerin, and the like. The quantity of the carbohydrate present in the nutrient medium is not particularly critical and can vary from about 0.5% to 5% by weight of the total weight of the medium.

The source of nitrogen in the nutrient medium may be of an organic, inorganic, or mixed organic-inorganic nature. Some examples of the many nitrogenous substances which may be employed in the nutrient medium are amino acids, peptones, hydrolyzed and unhydrolyzed proteins, fish meal, soybean meal, corn steep liquor, meat extracts, peanut meal, inorganic nitrates, urea, ammonium salts and the like. Due to the crude nature of most of the readily available nitrogenous substances, the quantity to be added to the nutrient medium varies somewhat in accordance with purity. However, it can be said for practical purposes that nitrogenous materials need not exceed 6% by weight of the total weight of the fermentation medium.

A certain amount of mineral salts is necessary to obtain the best yields of paromomycin. In general, many crude materials, such as corn steep liquor, butanol-acetone fermentation residues, yeast preparations, soybean oil meal, etc. contain mineral salts in sufficient amounts. However, in order to insure the presence of adequate amounts of the mineral components of the medium, it is usually advantageous to add a small amount of inorganic salts, such as sodium chloride, sodium bicarbonate, calcium carbonate, sodium acetate and the like. The preferred concentration of mineral salts is between 0.1 and 1% of the nutrient medium.

The cultivation of *Streptomyces rimosus* forma *paromomycinus* in the aqueous nutrient medium can be carried out in a number of different ways. For example, the microorganism can be cultivated under aerobic conditions on the surface of the medium or it can be cultivated beneath the surface of the medium, that is, in the submerged condition, if oxygen is simultaneously supplied.

The preferred method for producing paromomycin on a large scale involves the use of submerged or deep cultures of *Streptomyces rimosus* forma *paromomycinus*. According to this embodiment of the invention, a sterile, aqueous nutrient medium is inoculated with *Streptomyces rimosus* forma *paromomycinus* and incubated with agitation and aeration at a temperature between about 20 and 35° C., preferably in the neighborhood of 23–30° C., until a maximum concentration of paromomycin has been produced in the culture liquid. The length of time required for the maximum production of paromomycin varies with the size and type of equipment used. For example, in large-scale commercial fermentations such as are carried out in the tank-type fermentors, maximum production of paromomycin is reached in about three to six days. Incubation can be limited to shorter periods of time, but the yields are usually inferior. Longer incubation periods do not appear to decrease the amount of paromomycin present in the culture liquid. When shaker flasks are used for the incubation, the time of maximum production may be slightly longer than that required for the large-scale fermentation vats. Under the submerged culture conditions, the microorganism develops as more or less discrete particles dispersed throughout the nutrient medium in contrast to the more or less continuous pellicle present on the surface of the medium in the surface culture method. By virtue of this distribution of the organism throughout the medium, large volumes of the inoculated nutrient medium can be cultivated at one time in the large tanks and vats customarily employed in the fermentation industry. Stationary vat fermentors equipped with suitable agitation and aeration devices as well as horizontal rotary drum fermentors have been found to be particularly useful in this respect. However, for the preparation of smaller quantities of the antibiotic or of cultures of the microorganism, the submerged culture method may be carried out in small flasks or jars which are either shaken or stirred by suitable mechanical means.

Agitation and aeration of the culture mixture may be accomplished in a number of ways. Agitation may be provided by turbines, paddles, impellers or other mechanical agitation devices, by revolving or shaking the fermentor itself, by various pumping devices or by the passage of air through the medium. Aeration may be effected by injecting air into the fermentation mixture through open pipes, perforated pipes, porous diffusion media such as carbon sticks, Carborundum, sintered glass and the like, or it may be provided by spraying, splashing or spilling the mash into or through an oxygen-containing atmosphere.

The surface culture method of producing paromomycin involves inoculating a shallow layer, usually less than 2 cm., of a sterile, aqueous nutrient medium with *Streptomyces rimosus* forma *paromomycinus* and incubating the mixture under aerobic conditions at a temperature between about 20 and 35° C. A longer incubation period than that employed in the deep culture method is usually necessary to obtain the maximum production of paromomycin. In general, the incubation period is in the neighborhood of ten to fifteen days. After the incubation phase of the process is completed, the mycelium is removed from the liquid containing the desired paromomycin and the product isolated from the culture liquid by the methods hereinafter described.

After completion of the fermentation phase of the process, the solid material present in the culture mixture is removed by any suitable means such as filtration, centrifugation, etc. and the desired paromomycin is isolated from the residual culture liquid. Isolation is conveniently accomplished by ion exchange methods, preferably by adsorption and elution of the paromomycin employing a cation exchanger in the salt form. The paromomycin contained in the eluate can be isolated by concentration to dryness, or if desired, prior to isolation can be further purified by repeated adsorption and elution.

One of the preferred methods of isolating paromomycin from the culture mixture involves subjecting the residual culture liquid to adsorption and elution from a cation exchange resin in the salt form, concentrating the eluate, adsorbing the concentrated eluate on activated carbon, extracting paromomycin from the carbon and recovering free paromomycin or its mineral acid addition salt from the extract. In accordance with this method the culture liquid, obtained by removing solid material from the fermentation culture mixture, is adjusted to a pH of approximately 6.8 to 7.5 and is then passed through an adsorption column containing a carboxylic acid resin in the form of a salt, such as the sodium, potassium or ammonium salt. The resin containing the adsorbed paromomycin is washed with water and is then eluted with dilute aqueous mineral acid such as hydrochloric acid or base such as ammonium hydroxide. The eluate is concentrated, activated carbon is mixed with the concentrate, the carbon containing the adsorbed paromomycin or salt thereof is removed from the mixture, and the paromomycin or paromomycin salt is then eluted from the carbon with a suitable organic solvent such as an aqueous or anhydrous lower aliphatic alcohol or ketone. Paromomycin or the salt thereof can be isolated from the eluate by removing the solvent in vacuo or by precipitation.

In some cases, following elution of the paromomycin from the cation exchanger, it is desirable especially when substantial amounts of mineral salts are present, to raise the pH of the eluate by addition of base prior to adsorption on activated carbon. In these cases, the eluate is adjusted to about pH 9 to 9.7, activated carbon is mixed with the eluate, the carbon containing adsorbed paromomycin is removed from the mixture and washed with water, and the paromomycin is then eluted with dilute mineral acid. The paromomycin contained in the resulting eluate is isolated conveniently by passing the eluate through an exchanger containing an anion resin in the hydroxyl form, collecting and neutralizing the percolate and processing the neutral percolate further by exchange with a cation exchange resin, eluting with ammonium hydroxide and lyophilizing the eluate.

In accordance with another prefererd method of isolating paromomycin, the fermentation culture liquid is adsorbed and eluted in the manner indicated above employing a cation exchange resin, the pH of the resulting eluate is adjusted, if necessary, to about pH 4.5–7 and passed through a column containing a mixture of approximately equal amounts of activated carbon and diatomaceous earth. The paromomycin salt, which is retained on the column, is conveniently eluted by washing with water. Additional quantities of paromomycin remaining on the column after washing with water can be recovered by further washing with dilute aqueous organic solvents or dilute aqueous mineral acid. The paromomycin mineral acid salt can be obtained from the washings by removing the solvent in vacuo or by precipitation.

Paromomycin is highly active bacteriostatically against a wide variety of pathogenic organisms. In particular, paromomycin is fully active in vitro against staphylococcus strains which are resistant to oxytetracycline, erythromycin or carbomycin. Table IV illustrates the antibacterial spectrum of paromomycin employed as the sulfate in vitro.

TABLE IV

*Antibacterial spectrum of paromomycin sulfate [1]*

| Culture | Minimum Inhibitory Concentration of Paromomycin Sulfate [2] in ug./ml. |
| --- | --- |
| Clostridium perfringens | >100.0 |
| Corynebacterium diphtheriae | 0.39 |
| Diplococcus pneumoniae | 100.0 |
| Micrococcus pyogenes var. aureus | 0.78 |
| Streptococcus pyogenes | 25.0 |
| Streptococcus salivarius | 50.0 |
| Aerobacter aerogenes | 6.25 |
| Brucella suis | 3.13 |
| Escherichia coli | 12.5 |
| Klebsiella pneumoniae | 1.56 |
| Neisseria catarrhalis | 0.78 |
| Pasteurella multocida | 6.25 |
| Proteus vulgaris | 3.13 |
| Pseudomonas aeruginosa | 50.0 |
| Salmonella paratyphi | 1.56 |
| Salmonella schottmuelleri | 12.5 |
| Salmonella typhosa | 6.25 |
| Shigella dysenteriae | 12.5 |
| Shigella paradysenteriae | 12.5 |
| Shigella sonnei | 12.5 |
| Vibrio comma | 25.0 |
| Mycobacterium phlei | 0.19 |
| Mycobacterium tuberculosis var. hominis | 0.19 |

[1] Determined in two-fold serial broth dilution tests.
[2] Estimated purity 60-70%.

Paromomycin is a useful agent for the prevention of potential infection by pathogenic micro-organisms. Paromomycin is also useful for the treatment of local surface infection caused by various pathogens and is particularly applicable to the treatment of infections caused by staphylococcus strains which are resistant to various antibiotics commonly employed, e.g., oxytetracycline, erythromycin, carbomycin and the like. For these applications, paromomycin can be employed as the free base or as an acid-addition salt with an organic acid or a mineral acid such as hydrochloric acid, sulfuric acid, etc. It can be applied in various suitable forms, for example, as a powder in admixture with an inert diluent such as talc, starch, etc., as an ointment comprising an inert ointment base and a minor proportion of paromomycin, or as a dilute solution in water containing if desired a compatible surface-active agent. In these forms, paromomycin can conveniently be employed in a concentration of about 5 mg. per cubic centimeter in the case of solutions and about 5 mg. per gram in the case of powders and ointments. Paromomycin has the advantage of being relatively non-toxic and stable under varying conditions of use. In its use as a bacteriostat, paromomycin is applied directly to the site of infection, and further application is made periodically as required. If desired, paromomycin can be employed in combination with other bacteriostatic agents.

The invention is illustrated by the following examples.

EXAMPLE 1

Twelve liters of a nutrient medium having the following composition.

|  | Percent |
| --- | --- |
| Glucose monohydrate | 0.5 |
| Glycerol | 0.5 |
| Casein, acid hydrolyzed | 0.3 |
| Peptone | 0.25 |
| Brewer's yeast | 0.1 |
| Corn steep solids | 0.25 |
| Soybean oil meal | 0.25 |
| Acetone-butanol fermentation residue | 0.25 |
| Sodium chloride | 0.5 |
| Calcium carbonate | 0.1 |
| Water sufficient to make | 100.0 | is placed in a 30-liter fermentor equipped with stainless steel fittings including sparger, impeller, baffles and sampling lines and the medium is sterililized by heating at 121° C. for two hours. The medium is cooled and inoculated with 20 ml. of a suspension of the spores from two Moyer's sporulation agar slant cultures of *Streptomyces rimosus* forma *paromomycinus* in sterile 0.1% sodium heptadecyl sulfate solution. The inoculated culture mixture is incubated at 26° C. for sixty hours during which time the mixture is stirred at 200 r.p.m. and sterile air is passed into the medium through the sparger at the rate of 12 liters per minute. A portion of the resulting incubated culture mixture is employed for inoculation of sixteen liters of a nutrient medium having the following composition:

|  | Percent |
| --- | --- |
| Glucose monohydrate | 1.0 |
| Soybean oil meal | 1.0 |
| Sodium chloride | 0.5 |
| Calcium carbonate | 0.1 |
| Ammonium chloride | 0.167 |
| Hog stomach residue, saline extracted | 0.5 |
| Water sufficient to make | 100.0 |

The pH of the latter nutrient medium is adjusted to 7.5 with 10 N sodium hydroxide solution and is placed in a 30-liter glass fermentor equipped with sparger, impeller, baffles and sampling line. The medium is sterilized by heating at 121° C. for two hours, is allowed to cool and is then inoculated with 800 ml. of the culture mixture obtained as described above. The resulting culture mixture is incubated at 26° C. for ninety-four hours during which time the mixture is stirred at 200 r.p.m. and sterile air is passed into the medium into the medium through the sparger at the rate of 16 liters per minute. During the incubation, foaming is avoided by the addition, as needed, of crude lard and mineral oils containing mono- and di-glycerides.

At the end of the incubation period the fermentation culture mixture is adjusted to pH 2 with concentrated hydrochloric acid, the solid material present is removed by filtration, and the filter cake is washed with water. The washings are combined with the main filtrate, adjusted to pH 7.0, and 15.5 liters of the filtered culture liquid is introduced into a columnar exchanger (1½" I.D.) packed with 380 ml. of carboxylic acid resin which has been preliminarily washed in succession with two liters of an aqueous solution of 37.5 g. of sodium hydroxide and with two liters of water. The column containing paramomycin is washed with two hold-up volumes of water and is eluted with 0.5 N-hydrochloric acid. The first 19.4 liters of percolate contains little or no paromomycin and varies in pH from 6 to 7.3. When the pH of the eluate begins to fall below 6.0, two liters of the eluate are collected.

The two-liter portion of the eluate, collected as indicated, is neutralized to pH 6 with 10 N sodium hydroxide solution and is filtered. The filtrate is concentrated by evaporation in vacuo to a volume of approximately one liter.

An adsorption column is prepared by pouring a slurried aqueous mixture of 65 g. of acid-washed activated charcoal (Darco G-60) and 50 g. of diatomaceous earth in a 1½ inch column and 300 ml. of the concentrated filtrate is added. The column is washed with 400 ml. of water and eluted successively with 325 ml. of water, 425 ml. of 1% aqueous acetone and 400 ml. of 10% aqueous acetone. The water and acetone eluates are concentrated and lyophilized to give paromomycin hydrochloride as a powder. The product is purified by taking up the powder in methanol, adding a large excess of acetone to the solution, recovering the precipitate which forms by filtration. The product, paromomycin hydrochloride, has an optical rotation $[\alpha]_D^{25} = +56.5°$ (1% in water). By analysis it contains 35.71% carbon, 6.95% hydrogen, 8.42% nitrogen and 21.5% chlorine.

In order to obtain paromomycin in free base form, the hydrochloride is dissolved in water as a 3% solution, the solution is poured into an adsorption column containing an anion exchange resin (Amberlite IR–45, U.S. Patent No. 2,591,574, or preferably IRA–411 or IRA–400, U.S. Patent No. 2,591,573), in the hydroxyl form and the column is washed with a small amount of water. The aqueous percolate is concentrated to dryness by lyophilization, and the solid product obtained is purified by taking up in boiling absolute ethanol, cooling and recovering the solid product paromomycin; $[\alpha]_D^{25} = +64°$ (1% in water). By analysis it contains 45.17% carbon, 7.44% hydrogen and 10.35% nitrogen.

EXAMPLE 2

For the preparation of a fresh inoculum for the large scale production of paromomycin described hereinafter, 20 gallons of a nutrient medium having the following composition:

|  | Percent |
|---|---|
| Glucose monohydrate | 1.0 |
| Soybean oil meal | 1.0 |
| Hog stomach residue, saline extracted | 0.5 |
| Ammonium chloride | 0.167 |
| Sodium chloride | 0.5 |
| Calcium carbonate | 0.5 |
| Water sufficient to make | 100.0 | are placed in a 50-gallon stainless steel fermentor and the pH is adjusted to 7.5 with 6 N sodium hydroxide solution. The medium is sterilized by heating at 121° C. for one hour. The medium is then cooled and inoculated with 40 ml. of a suspension of spores of *Streptomyces rimosus* forma *paromomycinus* in 0.1% sterile sodium heptadecyl sulfate solution prepared in the same manner as described in Example 1. The culture mixture is incubated at 26° C. for sixty-four hours during which time sterile air is supplied through a sparger at the rate of 9.8 cubic feet per minute. During the incubation a sterilized mixture of crude lard and mineral oils containing mono- and di-glycerides is added as required to control foaming.

The incubated culture thus obtained is used to inoculate the main culture prepared in the following manner. One hundred and fifty gallons of medium having the composition:

|  | Percent |
|---|---|
| Glucose monohydrate | 1.0 |
| Soybean oil meal | 1.0 |
| Hog stomach residue, saline extracted | 0.5 |
| Ammonium chloride | 0.167 |
| Sodium chloride | 0.5 |
| Calcium carbonate | 0.5 |
| Water sufficient to make | 100.0 | is prepared in a 200-gallon stainless steel fermentor and the pH is adjusted to 7.5 with 6 N sodium hydroxide solution. The medium is sterilized by heating at 121° C. for one hour and is allowed to cool. The sterile medium is inoculated with ten gallons of the culture prepared as described above and is incubated at 26° C. for seventy-two hours during which time sterile air is supplied through a sparger at the rate of 33.6 cubic feet per minute and the culture mixture is agitated with an impeller revolving at the rate of 230 r.p.m. To avoid excessive foaming during incubation 8.1 liters of a sterile mixture of crude lard and mineral oils is added as required.

At the end of the incubation period, the culture mixture is adjusted to pH 2 with concentrated hydrochloric acid, filtered and the filter cake is washed with water. The combined filtrate and washes (149 gallons) are neutralized and added to an adsorption column (6″ I.D.) packed with 13 liters of carboxylic acid resin (Amberlite IRC–50; U.S. Patent No. 2,340,111), which has been preliminarily neutralized by percolation with a solution of 1,265 g. of sodium hydroxide in 60 liters of water. The column, containing paromomycin is washed with about 40 liters of water and eluted with 0.5 N hydrochloric acid. When the pH of the effluent from the column goes below 6, 88.5 liters of the eluate are collected, neutralized with 6 N sodium hydroxide solution, and concentrated by evaporation in vacuo to about one-tenth in volume.

One-quarter liter of the concentrated eluate is added to an adsorption column prepared by filling a water slurry of 80 g. of activated charcoal (Darco G–60) and 60 g. of diatomaceous earth into a one and one-half inch pipe having a capacity of approximately 360 ml. The paromomycin hydrochloride contained in the column is recovered by elution with one and one-half liters of water. The eluate is concentrated, frozen and dried from the frozen state under high vaccum. The solid product obtained, paromomycin hydrochloride, represents a 64% yield of the paromomycin activity originally present in the finished fermentation culture mixture.

To convert paromomycin hydrochloride to the corresponding sulfate, 1 g. of paromomycin hydrochloride is dissolved in 25 ml. of methanol and 4.5 ml. of one molar aqueous sulfuric acid is added to the solution. The precipitate which forms is isolated by filtration and the filter cake is washed with methanol and dried. The resulting product, paromomycin sulfate in a form containing chloride ion, is dissolved in water and the pH of the solution is adjusted to 6.0 by mixing with a sufficient quantity of anion exchange resin in the hydroxyl form. The resin is removed by filtration and the filtrate is concentrated by lyophilization. The residual gum is converted to a white solid by trituration with acetone. The solid product is isolated by filtration and is washed with acetone and dried. The product, paromomycin sulfate, has an optical rotation $[\alpha]_D^{25}$ of $+50.5°$ (1.5% in water).

EXAMPLE 3

For the preparation of a fresh inoculant for the large scale production of paromomycin as described hereinafter, 12 liters of a nutrient medium having the following composition:

|  | Percent |
|---|---|
| Glucose monohydrate | 2.0 |
| Soybean oil meal | 1.0 |
| Hog stomach residue, saline extracted | 0.5 |
| Ammonium chloride | 0.167 |
| Sodium chloride | 0.5 |
| Calcium carbonate | 0.5 |
| Water sufficient to make | 100.0 | are placed in a 30-liter stir jar fermentor and the pH is adjusted to 7.5 with 6 N sodium hydroxide solution. The medium is sterilized by heating at 121° for two hours. The medium is then allowed to cool and is inoculated with 20 ml. of a suspension of spores of *Streptomyces rimosus* forma *paromomycinus* in 0.1% sterile sodium heptadecyl sulfate solution prepared in the same manner as described in Example 1. The culture mixture is incubated at 26° C. for seventy-one hours during which time sterile air is supplied through a sparger at the rate of 12 liters per minute and the mixture is agitated by means of an impeller at the rate of 200 r.p.m.

The incubated culture thus obtained is used to inoculate the main culture prepared in the following manner. 10 gallons of medium having the composition:

|  | Percent |
|---|---|
| Glucose monohydrate | 2.0 |
| Soybean oil meal | 1.0 |
| Hog stomach residue, saline extracted | 0.5 |
| Ammonium chloride | 0.167 |
| Calcium carbonate | 0.5 |
| Sodium chloride | 0.5 |
| Water sufficient to make | 100.0 | are prepared in a 30-gallon stainless steel fermentor and the medium is sterilized by heating at 121° C. for one hour. The medium is allowed to cool and is then inoculated with 100 ml. of the fresh inoculant prepared as described above. The inoculated medium is incubated at 26° C. for twenty-four hours during which time sterile air is supplied through a sparger at the rate of 6.5 cubic feet per minute.

300 gallons of a nutrient medium having the same composition as described above are prepared and placed in a 500-gallon stainless steel fermentor and the medium is sterilized by heating at 121° C. for one hour. The sterile medium is allowed to cool and is inoculated with 10 gallons of the culture mixture obtained from the previous fermentation. The inoculated medium is incubated at 26° C. for twenty-three hours during which time aeration is supplied through a sparger at the rate of 45 cubic feet per minute and the medium is agitated by means of an impeller at the rate of 84 r.p.m. During the incubation to avoid excessive foaming 3.9 liters of a sterile mixture of crude lard and mineral oils containing mono- and di-glycerides is added as required.

1,200 gallons of a medium having the same composition as described above are prepared and placed in a 2,000-gallon stainless steel fermentor. The medium is sterilized by heating at 121° C. for one hour and is allowed to cool. The sterile medium is inoculated with 200 gallons of the culture mixture described immediately above and is incubated at 26° C. for forty-nine hours. During incubation, aeration is supplied at the rate of 120 cubic feet per minute and the medium is agitated by means of an impeller revolving at the rate of 125 r.p.m.

The culture mixture (2,050 gallons containing paromomycin in a concentration of approximately 0.2 mg./ml.) is filtered, the filter cake is washed with water, and the combined filtrate and washes are adjusted to pH 7.2. The culture liquid and washings, etc. (2,400 gallons), are added to an adsorption column prepared by packing an 18″ column with 184 liters of carboxylic acid resin (Amberlite IRC–50) and neutralizing the resin by percolation with 205 gallons of 0.6 N sodium hydroxide. The column is then washed with approximately 325 gallons of water and is eluted with 560 gallons of 0.5 N hydrochloric acid and 210 gallons of 0.6 N hydrochloric acid, water washes being employed after each acid elution to give a total eluate volume of 976 gallons.

Combined concentrated eluates from several such runs (total volume 810 gallons) are adjusted to pH 9.5 with 6 N sodium hydroxide. Activated carbon (Darco G–60) at the rate of 1.5% w./v. and diatomaceous earth at the rate of 1.0% w./v. are then added and the mixture is stirred for one-half hour. The mixture is filtered in a plate-and-frame press and washed with 995 gallons of water. The paromomycin is eluted with 245 gallons of 0.05 N sulfuric acid and 334 gallons of 0.1 N sulfuric acid. The sulfuric acid eluates are combined and passed over 100 pounds of anion exchange resin (Amberlite IR–45) in the hydroxyl form. The pH of the eluate is determined periodically and when it falls below pH 9, the resin is regenerated. The percolate contains the free base paromomycin.

A portion of concentrated percolate, containing 1.3–1.5 g. of paromomycin, is adjusted to pH 7.3 with 1 N sulfuric acid and is passed through 5 ml. of a carboxylic acid resin the ammonium form. The resin is washed with water and the wash containing a small amount of activity is discarded. The paromomycin is eluted with 1 N ammonium hydroxide and the eluate is freeze-dried. The yield of the desired product, paromomycin, is 1.125 g. The product has an activity of 1840 units/mg. when assayed against *B. subtilis*.

Paromomycin free base produced as described above can be converted to the corresponding laurate, undecylenate and oleate slats by dissolving the paromomycin free base in water and adding a methanol solution containing four to five molecular equivalents of lauric acid, undecylenic acid or oleic acid, respectively. The methanol is allowed to evaporate slowly from the solution and the residual gum separated by decantation. The crude salt is dried in vacuo, triturated first with ether and then with petroleum ether and finally dried. These three salts are amorphous powders. Paromomycin also forms salts with other organic acids such as acetic acid, citric acid, maleic acid, tartaric acid and the like. These latter salts are for the most part water soluble.

This application is a continuation-in-part of application Serial No. 509,824, filed May 20, 1955, and application Serial No. 782,010, filed December 22, 1958, now abandoned.

We claim:

1. A compound of the class consisting of paromomycin and its pharmaceutically-acceptable acid-addition salts; said paromomycin being a compound having the formula,

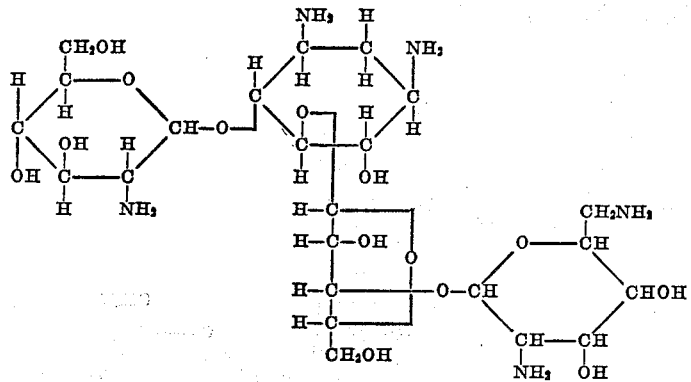

an optical rotation $[\alpha]_D^{25}$ of $+64° \pm 3°$ (c.=1% in $H_2O$) and high activity in vitro against *Micrococcus pyogenes* var. *aureus*; *Salmonella paratyphi* and *Mycobacterium tuberculosis* var. *hominis*.

2. Paromomycin, a compound having the formula,

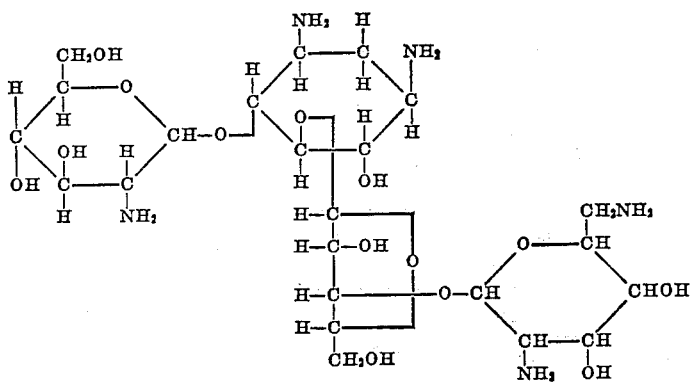

an optical rotation $[\alpha]_D^{25}$ of $+64°\pm3°$ (c.=1% in $H_2O$) and high activity in vitro against *Micrococcus pyogenes* var. *aureus Salmonella paratyphi* and *Mycobacterium tuberculosis* var. *hominis*.

3. A pharmaceutically-acceptable mineral acid salt of paromomycin, said paromomycin being a compound having the formula,

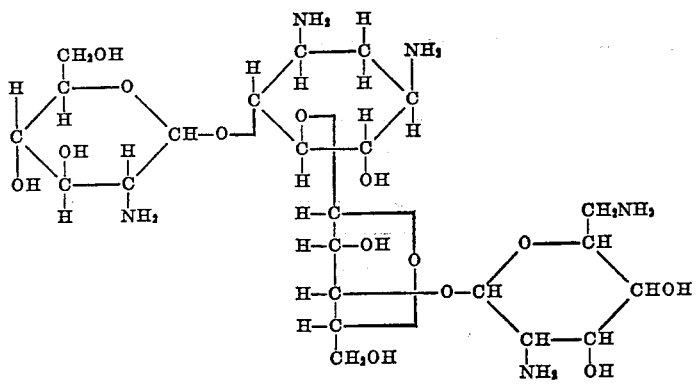

an optical rotation $[\alpha]_D^{25}$ of $+64°\pm3°$ (c.=1% in $H_2O$) and high activity in vitro against *Micrococcus pyogenes* var. *aureus, Salmonella paratyphi* and *Mycobacterium tuberculosis* var. *hominis*.

4. A sulfate salt of paromomycin, said paromomycin being a compound having the formula,

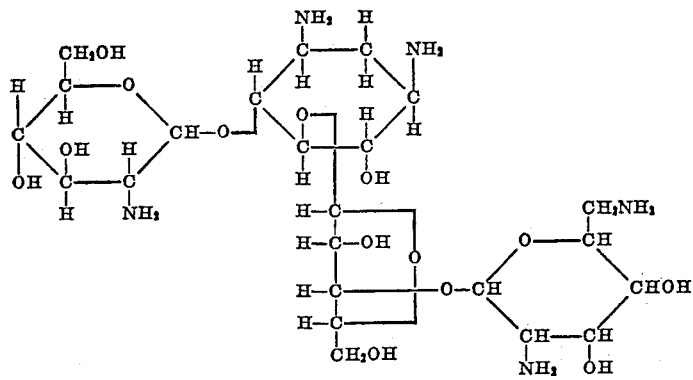

an optical rotation $[\alpha]_D^{25}$ of $+64°\pm3°$ (c.=1% in $H_2O$) and high activity in vitro against *Micrococcus pyogenes* var. *aureus, Salmonella paratyphi* and *Mycobacterium tuberculosis* var. *hominis*.

5. A hydrochloride salt of paromomycin, said paromomycin being a compound having the formula,

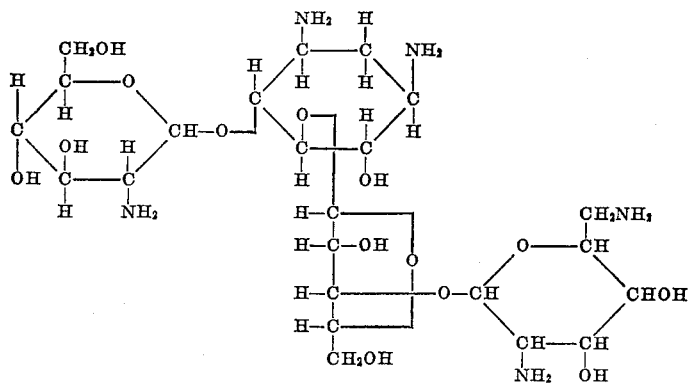

an optical rotation $[\alpha]_D^{25}$ of $+64°\pm3°$ (c.=1% in $H_2O$) and high activity in vitro against *Micrococcus pyogenes* var. *aureus*, *Salmonella paratyphi* and *Mycobacterium tuberculosis* var. *hominis*.

6. A process for the production of paromomycin which comprises the steps of inoculating a sterile aqueous nutrient medium containing an assimilable carbon source and a source of nitrogen and minerals with *Streptomyces rimosus* forma *paromomycinus*, and incubating the inoculated medium at a temperature in the neighborhood of 20 to 35° C. under aerobic conditions.

7. A process for the production of paromomycin which comprises inoculating a sterile aqueous nutrient medium having a pH between 6 and 8.5 and containing an assimilable carbon source and a source of nitrogen and minerals with *Streptomyces rimosus* forma *paromomycinus*, incubating the inoculated medium at a temperature of about 20 to 35° C. under aerobic conditions for about 3 to 6 days, and recovering the paromomycin so produced from the incubated medium.

8. A process for the production of paromomycin which comprises cultivating *Streptomyces rimosus* forma *paromomycinus* under aerobic conditions at a temperature in the range from 20 to 35° C. in the submerged state in a sterile aqueous nutrient medium having a pH between 6 and 8.5 and containing an assimilable carbon source and a source of nitrogen and minerals.

9. A process for the production of paromomycin which comprises inoculating a sterile aqueous nutrient medium having a pH between 6 and 8.5 and containing an assimilable carbon source and a source of nitrogen and minerals with the organism *Streptomyces rimosus* forma *paromomycinus*, incubating the inoculated medium at a temperature in the range from 23 to 30° C. while agitating and passing sterile air into the medium so as to cause the organism to develop as discrete particles dispersed in said medium, and separating undissolved solid material from the culture liquid after incubation thereby obtaining an aqueous solution containing a high concentration of paromomycin.

10. In a process for producing a pharmaceutically-acceptable acid-addition salt of paromomycin, the steps which comprise contacting a solid-free neutralized, incubated, aqueous culture liquid containing paromomycin with a carboxylic acid exchange resin in the salt form, eluting the paromomycin from the resin with dilute mineral acid, adjusting the pH of the eluate to between 4.5 and 9.7, contacting the solution with activated carbon and recovering the absorbed paromomycin in the form of a pharmaceutically-acceptable acid-addition salt by elution.

11. In a process for producing a pharmaceutically-acceptable acid-addition salt of paromomycin, the steps which comprise contacting a solid-free neutralized, incubated, aqueous culture liquid containing paromomycin with a carboxylic acid exchange resin in the salt form, eluting the paromomycin from the resin with dilute mineral acid, adjusting the pH of the eluate to between 4.5 and 7, concentrating the solution, contacting the concentrate with activated carbon and eluting the paromomycin in the form of a pharmaceutically-acceptable acid-addition salt from the activated carbon with water.

No references cited.

UNITED STATES PATENT OFFICE
CERTIFICATE OF CORRECTION

Patent No. 2,916,485                            December 8, 1959

Roger P. Frohardt et al.

It is hereby certified that error appears in the printed specification of the above numbered patent requiring correction and that the said Letters Patent should read as corrected below.

Column 3, line 6, for "=7%" read -- =0.7% --; column 4, line 18, for "laterial" read -- lateral --; line 21 for "sport" read -- spore --; column 8, line 53, for "prefererd" read -- preferred --; column 9, Table IV, second column thereof, in the heading, last line, for "ug./ml." read -- $\mu$g./ml. --; column 10, line 35, strike out "into the medium", second occurrence; column 14, line 15, after "resin", first occurrence, insert -- in --; line 24, for "slats" read -- salts --.

Signed and sealed this 16th day of August 1960.

(SEAL)
Attest:

KARL H. AXLINE
Attesting Officer

ROBERT C. WATSON
Commissioner of Patents